Dec. 31, 1929.                 O. H. SPENCER                    1,741,346
                VEHICLE BODY AND TIRE CARRIER COMBINED
                     Filed March 10, 1928    2 Sheets-Sheet 1

Owen H. Spencer
Inventor

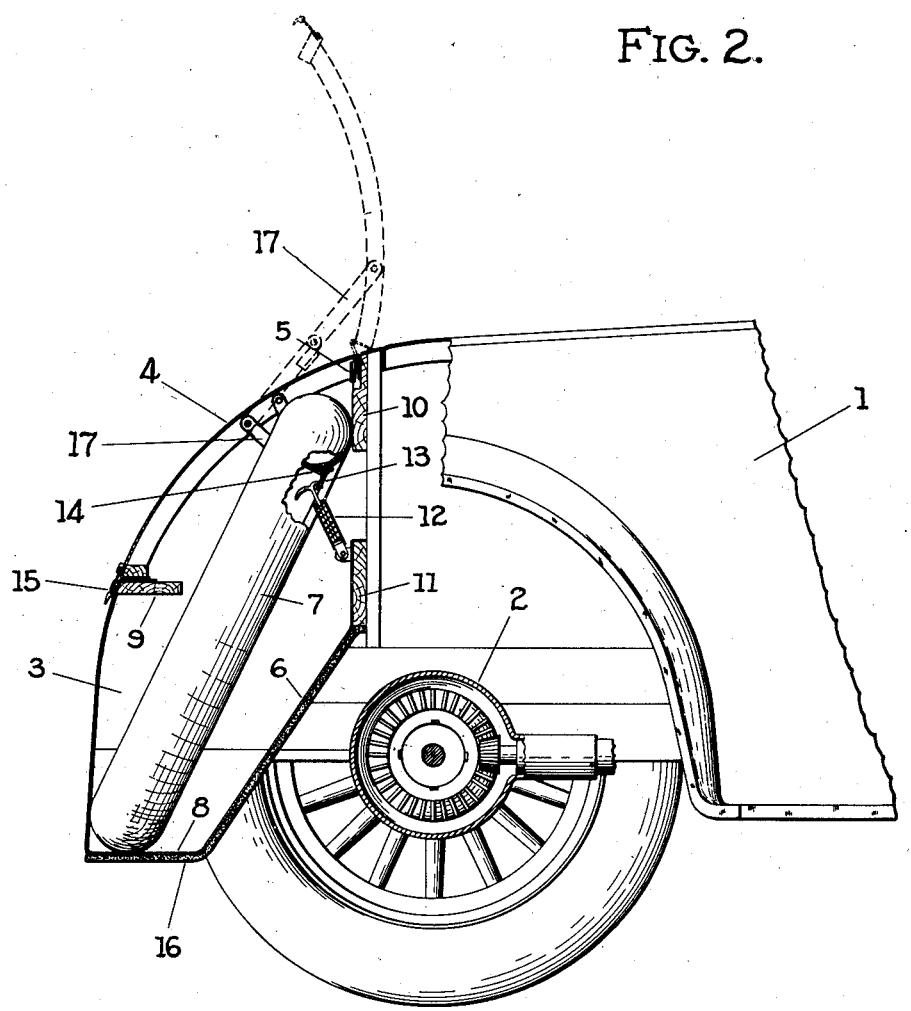

Patented Dec. 31, 1929

1,741,346

UNITED STATES PATENT OFFICE

OWEN H. SPENCER, OF INDIANAPOLIS, INDIANA

VEHICLE BODY AND TIRE CARRIER COMBINED

Application filed March 10, 1928. Serial No. 260,668.

This invention relates to vehicle bodies and particularly to automobile, bus or truck bodies and the prime feature of the invention is the provision of a receptacle or pocket means partly protruding from the vehicle body for carrying one or more spare tires and formed in such a manner as to exclude the spare tire from view and protect it from the inclemencies of the weather, so arranged that the unsightly under gears of the vehicle will be practically excluded from view.

A further feature of the invention is the provision of a door or cover for the receptacle or pocket, so arranged that it will conform to and become a part of the outline of the vehicle body, when closed.

A further feature of the invention is in so constructing the receptacle or pocket that the tire will be caused to rest in a position to conform more generally to the outlines of the pocket.

A further feature of the invention is in so constructing and positioning the receptacle or pocket that it will be more or less protected from injury incident to objects striking thereagainst.

A further feature of the invention is the provision of means for securely locking the tire against unnecessary movement within the receptacle or pocket.

Other objects and advantages will be hereinafter more fully set forth and pointed out in the accompanying specification.

In the accompanying drawing which is made a part of this application,

Figure 2 is a sectional view therethrough with the cover in closed position.

Figure 1:
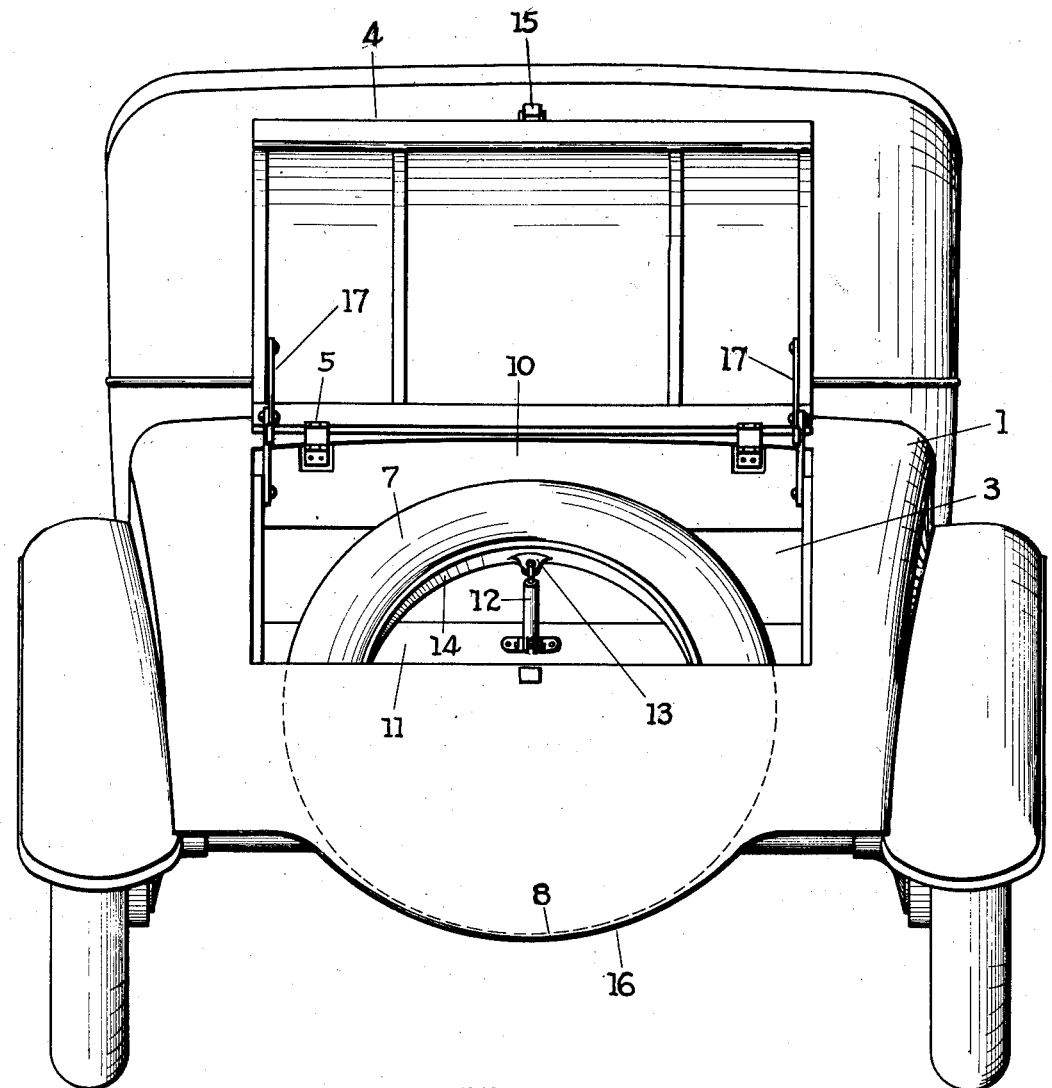
Figure 1 is an end elevation of a vehicle body embodying my invention with the cover in elevated or open position.

Referring to the drawings, 1 indicates the body of the vehicle, in this instance an automobile, and 2 indicates the rear axle and differential housing. At the extreme rear end of the body portion 1 is formed a receptacle or pocket 3, preferably of metal which is so constructed as to form a continuation of the body 1, said receptacle extending downwardly in the rear of the housing 2, thus excluding the unsightly portion of the housing from view from the rear of the vehicle.

The upper portion of the receptacle 3 is provided with a cover or door 4, the hinges 5 of which are preferably of the expanding type so that the cover may be readily swung to open or closed position, as indicated by dotted lines in Fig. 2, regardless of the oval contour of the wall of the receptacle, while the inner wall 6 of the receptacle is preferably placed at an inclination, as shown in Fig. 2, for causing the lower portion of the tire 7, when placed in the receptacle to move towards the outer wall of the receptacle and wedge against parts thereof, and to present the least possible resistance to the air passing beneath the automobile, while in motion. The lower wall of the receptacle 3 is provided with a curved portion 8 to form a curved recess in which the lower extremity of the tire fits, thus preventing undue lateral movement of the tire, the periphery of the tire substantially fitting and wedging against the wall of the recess.

Any suitable frame members 9, 10, and 11 are placed within the receptacle 3 which lend rigidity to the receptacle as well as supports therefor. Owing to the restricted area within the receptacle the tire rests at an angle within the receptacle, the inclination of the wall 6 causing the lower portion of the tire to swing rearwardly when entered in the receptacle and assume a more or less inclined position, and by providing the usual or a preferred form of spring actuated locking bolt 12, such as is commonly employed for locking the hood of an automobile in closed position, the tire may be held against any undue movement within the receptacle. When this form of securing means is employed, one end thereof is pivoted to the frame member 11, while the hook end thereof engages the usual form of bolt eye 13 on the rim 14 for the tire, the position of the locking bolt 12 acting to draw the upper portion of the tire against the frame member 10 under tension. Any suitable form of lock 15 may be provided for securing the cover in closed position.

The face of the inclined wall 6 and the bottom wall of the receptacle are preferably covered with any suitable cushioning means 16, to eliminate any undue noises such as gravel, pebbles or the like, thrown up by the wheels of the vehicle, striking thereagainst.

By constructing the tire carrying receptacle in this manner, the contour of the body of the automobile is symmetrical from end to end and the unsightly rear axle is to a great extent hidden from view, from the rear. Furthermore, the tire is completely hidden from view and protected from the inclemencies of the weather.

The folding braces 17 are provided at each end of the cover door 4 and are preferably of a knee joint type adapted to automatically straighten into working position when the door is opened as shown by dotted lines in Figure 2 and solid lines in Fig. 1, the same to be at other times folded as indicated by solid lines of Fig. 2. It is obvious however, that any other suitable device may be used to hold the cover open, as desired.

While the description and drawing illustrate in a general way certain instrumentalities which may be employed in carrying the invention into effect, it is evident that many modifications may be made in the various details, without departing from the scope of the appended claims, it being understood that the invention is not restricted to the particular example herein described.

What I claim is:

A tire carrying receptacle for vehicles, comprising a hollow substantially vertically extending receptacle having an inner face wall the upper portion of which is substantially vertical and the lower portion inclined inwardly, end walls, an outer face wall the lower portion of which is vertical and the upper portion curved and formed into a hinged cover, a horizontal bottom wall, and a downwardly extending arcuately curved recess in said bottom wall between the ends thereof arranged to receive and fit the peripheral contour of a tire and prevent lateral movement of the tire within the receptacle.

In testimony whereof, I have hereunto set my hand on this the 6th day of March, 1928 A. D.

OWEN H. SPENCER.